United States Patent
Guinot et al.

(10) Patent No.: US 7,326,290 B2
(45) Date of Patent: Feb. 5, 2008

(54) LIQUID SETTING ACCELERATOR FOR A COMPOSITION COMPRISING PORTLAND CEMENT

(75) Inventors: Dominique Guinot, L'Isle d'Abeau (FR); Eric Charpentier, Chambery (FR); Eric Frier, Lyons (FR)

(73) Assignee: Kerneos, Paris (FR)

(*) Notice: Subject to any disclaimer, the term of this patent is extended or adjusted under 35 U.S.C. 154(b) by 157 days.

(21) Appl. No.: 10/540,976

(22) PCT Filed: Dec. 24, 2003

(86) PCT No.: PCT/FR03/50212

§ 371 (c)(1),
(2), (4) Date: Jun. 27, 2005

(87) PCT Pub. No.: WO2004/060828

PCT Pub. Date: Jul. 22, 2004

(65) Prior Publication Data

US 2006/0070553 A1  Apr. 6, 2006

(30) Foreign Application Priority Data

Dec. 27, 2002 (FR) .................................. 02 16779

(51) Int. Cl.
*C04B 22/00* (2006.01)
(52) U.S. Cl. ...................... 106/693; 106/693; 106/724; 106/730; 106/819; 106/823
(58) Field of Classification Search ................ 106/693, 106/724, 730, 819
See application file for complete search history.

(56) References Cited

U.S. PATENT DOCUMENTS

| | | | | |
|---|---|---|---|---|
| 3,973,978 | A | * | 8/1976 | Nakagawa et al. |
| 4,012,264 | A | | 3/1977 | Murray et al. |
| 4,060,425 | A | * | 11/1977 | Harada et al. |
| 4,082,561 | A | * | 4/1978 | Nakagawa et al. |
| 4,357,167 | A | * | 11/1982 | Kellet et al. |
| 4,455,171 | A | | 6/1984 | Spensley et al. |
| 4,983,220 | A | * | 1/1991 | Mathieu ................ 106/692 |
| 6,244,343 | B1 | | 6/2001 | Brothers et al. |
| 6,641,658 | B1 | * | 11/2003 | Dubey ................... 106/705 |
| 7,029,527 | B2 | * | 4/2006 | Gaudry et al. .......... 106/695 |

FOREIGN PATENT DOCUMENTS

| | | |
|---|---|---|
| EP | 0 228 595 | 7/1987 |
| EP | 0769482 A1 * | 4/1997 |
| WO | WO 03/054304 | 7/2003 |

OTHER PUBLICATIONS

Answer 2 of 2 Chem Abstracts from STN ☐☐☐☐JP 05009049 Watanabe et al. (Jan. 19, 1993). abstract only.*
Answer 25 of 28 STN on Chem Abstracts☐☐☐☐JP 02145469 (Jun. 4, 1990) Aiko et al. (abstract only).*
Answer 2 of 2 on Chem Abstracts STN☐☐☐☐JP 05009049 (Jan. 19, 1993) Watanabe et al. (abstract only).*

* cited by examiner

*Primary Examiner*—Paul Marcantoni
(74) *Attorney, Agent, or Firm*—Young & Thompson (57) ABSTRACT

The invention relates to a setting accelerator for a composition comprising Portland cement, in the form of a slurry comprising at least one calcium aluminate, 0.5 4%, preferably 0.6 2.3% of an aluminous cement setting inhibitor by weight in relation to the overall weight of the calcium alumnate, and an anti-sedimentation agent.

15 Claims, 4 Drawing Sheets

LIQUID SETTING ACCELERATOR FOR A COMPOSITION COMPRISING PORTLAND CEMENT

The invention refers to a liquid setting accelerator based on calcium aluminates, for accelerated setting of compositions comprising Portland cement.

Such a setting accelerator should have a lifetime of several weeks to several months. By lifetime of the setting accelerator is meant the duration for which it remains in slurry state (defined by the aqueous suspension of solid products) more or less fluid, capable of returning to the slurry state by simple mechanical stirring, without setting. When it is mixed to the composition comprising Portland cement, it still possesses its accelerating properties.

The invention also refers to a method of production of a liquid setting accelerator for a composition comprising Portland cement.

The invention refers finally to a method for accelerated setting of a composition comprising Portland cement.

There are numerous situations wherein the setting of a composition comprising Portland cement is desired at a precise moment while having a ready-to-use setting accelerator. Such examples are in particular the building and the overhauling of infrastructure works, such as street or road carriageways, pavements. One may also quote the maintenance and the construction of electric cable networks, gas or water ducts. Overhauling works also require digging cavities, which is disturbing for the users of said works. Consequently, it is necessary to fill in said cavities rapidly, so that said works may be put back into operation as quickly as possible upon completion of the operations.

The patent application EP 0081385 divulges an aluminous cement whereof the setting phase is prevented by a setting inhibitor, for instance boric acid. The setting of the aluminous cement is triggered by the introduction into the aluminous cement of a re-activator, for instance lime, present in an amount ranging between 0.1 and 10% in weight relative to the weight of aluminous cement.

The patent application EP 0081385 does not intend therefore to provide a liquid setting accelerator based on calcium aluminates for accelerated setting of the composition comprising Portland cement.

The present invention therefore intends to provide such a liquid setting accelerator, with moreover the following properties:

No setting for a period of several weeks to several months in order to handle the storage and delivery times on site,
Keep a fluid nature and segregate, in particular during transport, in order to guarantee its implementation on site, by gravitational tapping or by pumping for instance,
Keep its accelerating power of the Portland cement in formulations, in particular mortars or concretes, in particular delivered by mixer truck,
Provide, if necessary, an additional colouring function available in a wide range of colours.

The setting accelerator for a composition comprising Portland cement according to the invention is in the form of an aqueous suspension (commonly called "slurry") more or less fluid and contains:
at least one calcium aluminate,
from 0.5 to 4%, preferably from 0.6 to 2.3%, in weight relative to the total weight of the calcium aluminate(s), of a setting inhibitor of the aluminous cements,
at least one anti-settling agent.

The setting accelerator for a composition comprising Portland cement according to the invention may also comprise a dispersive agent.

Generally, the dry extract of the aqueous suspension amounts to approx. 60%.

According to a first preferred embodiment, the setting inhibitor comprises boric acid and/or at least one boric acid salt, and citric acid and/or at least one citric acid salt, the boric acid and/or the boric acid salt(s) representing preferably from 0.4 to 3%, better from 0.5 to 2%, in weight of the total weight of the calcium aluminate(s), and citric acid and/or the citric acid salt(s) representing preferably from 0.1 to 1%, better from 0.1 to 0.5%, in weight of the total weight of the calcium aluminate(s).

The boric acid salt(s) may be selected among zinc borate, sodium borate and the mixtures thereof.

The citric acid salt may be sodium citrate.

More preferably, the setting inhibitor is composed of boric acid and of citric acid.

Boric acid and citric acid contribute to preventing the setting accelerator from setting, by two additional mechanisms.

Boric acid enables, via the formation of calcium borate, to limit considerably the solubility of the calcium aluminate(s) in water.

Citric acid delays mass precipitation of the hydrates corresponding to the setting. Citric acid also has as a side-effect, a fluidising effect.

The combination of both these mechanisms enables to obtain liquid setting accelerators of calcium aluminates remaining in slurry state for several months, while preserving their accelerating properties.

According to a second preferred embodiment, the setting inhibitor comprised in the setting accelerator according to the invention consists of boric acid and/or at least one boric acid salt, boric acid and/or the boric acid salt(s) representing from 0.5 to 4% in weight of the total weight of the calcium aluminate(s).

Indeed, in some cases, it is necessary to increase the setting inhibitor content to ensure sufficient lifetime to the setting accelerator. But at the same time, the accelerating power of the setting accelerator on Portland cement should be preserved. Citric acid (or the salts thereof having a negative effect on the acceleration of the Portland cement, it is preferable to increase the boric acid content (or the salts thereof to lengthen the lifetime of the setting accelerator, while reducing, let alone eliminating, the citric acid content (or the salts thereof).

Increase in the boric acid content leads generally to a thickening of the setting accelerator which may be corrected while increasing the dispersive agent content.

When the setting accelerator according to the invention is mixed with a composition comprising Portland cement, the pH of the medium increases, rendering the setting inhibitor of the aluminous cements inoperable. The hydration reaction of the calcium aluminate(s) is then released, without any supplementary addition of activator, and the setting accelerator according to the invention may then cause the setting of the composition comprising Portland cement.

The dispersive agent(s) present in the setting accelerator according to the invention represent generally from 0.3 to 1.7%, preferably 0.5% to 0.9% in weight of the total weight of the calcium aluminate(s).

As dispersive agent usable according to the invention, one may quote the Sokalan CP10, marketed by BASF.

The dispersive agent(s) usable according to the invention may also be selected among the superplasticizers.

The superplasticizers are conventional constituents of the concretes intended to improve the rheology of the concrete. Among these superplasticizers, the polyoxyethylene phosphonates POE, the polyox polycarboxylates PCP, and the mixtures thereof will be recommended particularly. These superplasticizers are products available commercially; by way of example, one may quote the product PREMIA 150® marketed by CHRYSO.

The anti-settling agent(s) present in the setting accelerator according to the invention represent generally from 0.2 to 0.9% in weight of the total weight of the calcium aluminate(s).

Preferably, the anti-settling agent(s) are selected among organic products such as Xanthan gum, Welan gum, or mineral products such as clays (Bentonite for instance) and the mixtures thereof.

The setting accelerator according to the invention may also comprise an anti-bacterial agent, representing then preferably from 0.2 to 0.9% in weight of the total weight of the calcium aluminate(s).

As an anti-bacterial agent usable in the setting accelerator according to the invention, one may quote the product ECOCIDE K35R, marketed by PROGIVEN.

The setting accelerator according to the invention may still contain at least one colouring agent.

The colouring agent(s) usable in the setting accelerator according to the invention may be any type of colouring agent generally used in the cement compositions. One may quote for instance the blue Pigmosol 6900, or the red Pigmosol 3855, which are organic colouring agents marketed by BASF.

One may also use the mineral colouring agents which last longer and are more efficient in terms of colouring effect than the organic colouring agents. Thus, certain mineral oxides are very good colouring agents.

The setting accelerator according to the invention enables to accelerate the setting of compositions comprising Portland cement. Among these compositions, one may quote Portland cement properly speaking, slag cements, pozzolana cements and hydraulic limes as well as mortars and concretes comprising Portland cement, slag cement, pozzolana cement or hydraulic lime.

The invention also refers to a method of production of a setting accelerator for a composition comprising Portland cement as defined previously.

According to the invention, this method contains the following steps:
  pouring water into a mixing tub,
  turbine stirring at a speed greater than 600 rpm, preferably of the order of 800 rpm,
  adding the setting inhibitor of the aluminous cements,
  adding the dispersive agent(s),
  adding gradually the calcium aluminate(s), whereas turbine stirring is raised to a speed greater than 1.000 rpm, preferably of the order of 1.400 rpm,
  adding the anti-settling agent(s),
  turbine stirring for at least 15 minutes, preferably for 30 to 40 minutes.

Stirring is conducted preferably by a deflocculating turbine capable of causing high shearing effect. Such a turbine enables to ensure good mechanical dispersion of the cement particles. This is necessary to ensure on the one hand their good chemical deflocculation by the dispersive agent, and on the other hand, their good stabilisation by the anti-settling agent.

When the setting accelerator according to the invention includes one or several colouring agents, said colouring agents are introduced preferably after the anti-settling agent.

The invention finally concerns a method for accelerated setting of a composition comprising Portland cement, consisting in adding to said composition comprising Portland cement a setting accelerator as defined previously, said setting accelerator representing from 10 to 40% in weight of calcium aluminate relative to Portland cement, which represents a quantity of setting accelerator aqueous suspension around 17 to 67% in weight relative to Portland cement.

As previously, by composition comprising Portland cement is meant Portland cement properly speaking, slag cements, pozzolana cements and hydraulic limes as well as mortars and concretes comprising Portland cement, slag cement, pozzolana cement or hydraulic lime.

Thus, the setting accelerator content relative to Portland cement may vary in order to obtain the requested mechanical strength of the composition within the time requested. This content will depend on the nature of the Portland cement used and of its mineralogical composition, in particular of its C3A content, where C represents, in the cement notation, calcium oxide CaO and A represents, in the cement notation, aluminium oxide $Al_2O_3$.

Such setting accelerating method is particularly advantageous for filling in a cavity by dint of a Portland cement-based mortar, said mortar being available at the discharge orifice of a transport vehicle bringing said mortar to the vicinity of said cavity. In such a case, the operation proceeds preferably as follows:
  a first flux is formed, composed of said mortar and moving towards the cavity,
  a second flux is formed, composed of said setting accelerator and moving towards the first flux,
  said first and second fluxes are merged into a third flux,
  said third flux is introduced by gravitation into said cavity.

Thus, the addition and the continuous mixture of the setting accelerator and of the mortar may be conducted outside the mixer of the transport vehicle, after discharging the ready-to-use mortar and just before the quick-setting mortar is placed inside the cavity.

Thus, the mortar may not harden inside the mixer, which may happen when the mortar is not used immediately. The mixer may not be clogged by the layer of mortar which adheres to the inside vanes of the mixer and which hardens before the mixer truck returns to the factory and is cleaned up.

The invention is illustrated by the following examples, referring to FIGS. 1 to 6.

EXAMPLE 1

Setting accelerators are prepared according to the invention, and the evolution of their fluidity can be observed.

Each setting accelerator is prepared according to the following method.

Water is introduced in the mixing tub and the deflocculating turbine is started at a speed of 800 rpm.

Boric acid is then introduced in the tub. Solubilising the borate ions and fixing the pH of the solution before introduction of the calcium aluminates prevents reliably the hydration thereof.

The solution is stirred for 5 minutes, in order to ensure complete dissolution of boric acid.

Citric acid is then introduced.

The solution is stirred again for 5 minutes.

Then the Sokalan CP10 (dispersive agent) is added, which enables the deflocculation of the medium.

The solution is stirred for 5 minutes.

The calcium aluminates are added gradually, while increasing the mingling speed of the turbine up to 1400 rpm. One provides thus, via the high rotational speed and the deflocculating turbine, good mechanical dispersion of the calcium aluminates.

Then the Ecocide K35R (anti-bacterial agent) is added.

One stirs for 5 minutes.

Then Xanthan gum (anti-settling agent) is added.

The solution is then mingled for 30 to 40 minutes, to ensure good dispersion of the calcium aluminates in the medium and enable the Xanthan gum to develop its anti-settling effect.

Finally, if required, the colouring agent is added.

Table 1 shows the compositions of the setting accelerators, as well as the evolution of their fluidity.

The contents of each constituent are given in % in weight relative to the total weight of the calcium aluminate(s).

The fluidity is measured at 3 different temperatures: 5° C., 20° C. and 40° C.

TABLE 1

| N° | Composition | % | E.S % | | The slurry remains fluid and homogeneous for: | *** | The slurry hardens or becomes compact and unsuitable for re-mixing after: |
|---|---|---|---|---|---|---|---|
| 1 | AB-AC/CP10/XG-K35R | 0.6-0.1/0.5/0.27-0.25 | 61.74 | 5° C. | 7 weeks | | 8.5 weeks |
| | | | | 20° C. | 2 weeks | | 2 weeks |
| | | | | 40° C. | 5 days | | 1 week |
| 2 | AB-AC/CP10/XG-K35R | 1.2-0.2/0.5/0.27-0.25 | 61.73 | 5° C. | 9 weeks | | >24 weeks |
| | | | | 20° C. | 5 weeks | | 13 weeks |
| | | | | 40° C. | 2 weeks | | 2.5 weeks |
| 3 | AB-AC/CP10/XG-K35R | 1.8-0.3/0.5/0.27-0.25 | 61.89 | 5° C. | 10 weeks | | >22 weeks |
| | | | | 20° C. | 14 weeks | | >22 weeks |
| | | | | 40° C. | 6.5 weeks | | >9.5 weeks |
| 4 | AB-AC/CP10/XG-K35R | 1.2-0.1/0.5/0.27-0.25 | 61.74 | 5° C. | 9 weeks | | >24 weeks |
| | | | | 20° C. | 5 weeks | | 12 weeks |
| | | | | 40° C. | 1.5 weeks | | 6.5 weeks |
| 5 | AB-AC/CP10/XG-K35R | 1.8-0.1/0.5/0.27-0.25 | 61.74 | 5° C. | 6 weeks | | >24 weeks |
| | | | | 20° C. | 5 weeks | | 11 weeks |
| | | | | 40° C. | 1.5 weeks | | 6.5 weeks |
| 6 | AB-AC/CP10/XG-K35R- Bent G | 0.6-0.1/0.5/0.27-0.25-1 | 61.35 | 5° C. | 8 weeks | | 19 weeks |
| | | | | 20° C. | 3 weeks | | 10 weeks |
| | | | | 40° C. | 3 weeks | | 3 weeks |
| 7 | AB-AC/CP10/XG-K35R-Eth | 1.2-0.2/0.5/0.27-0.25-8.7 | 58.8 | 5° C. | 19 weeks | | >24 weeks |
| | | | | 20° C. | 15 weeks | | >24 weeks |
| | | | | 40° C. | 6 weeks | | 13 weeks |
| 8 | AB-AC/CP10/XG-K35R | 1.2-0.2/0.5/0.27-0.25 | 61.54 | 5° C. | 1.5 weeks | | 6 weeks |
| | | | | 20° C. | 1.5 weeks | | 4.5 weeks |
| | | | | 40° C. | 1 week | | 2 weeks |
| 9 | AB-AC/CP10/XG-K35R | 1.2-0.2/0.5/0.27-0.25 | | 5° C. | 2 weeks | | 9 weeks |
| | | | | 20° C. | 6 weeks | | 9 weeks |
| | | | | 40° C. | 2 weeks | | 4.5 weeks |
| 10 | AB-AC/CP10/XG-K35R | 1.2-0.2/0.5/0.27-0.25 | | 5° C. | 4 weeks | | 7 weeks |
| | | | | 20° C. | 5 weeks | | 7 weeks |
| | | | | 40° C. | 1 week | | 3 weeks |
| 11 | AB-AC/CP10/XG-K35R | 1.8-0.3/0.5/0.27-0.25 | | 5° C. | >2.5 weeks | | >2.5 weeks |
| | | | | 20° C. | >2.5 weeks | | >2.5 weeks |
| | | | | 40° C. | >2 weeks | | >2.5 weeks |

TABLE 1-continued

|   |   |   |   | Evolution of the slurry: | | |
|---|---|---|---|---|---|---|
| N° | Composition | % | E.S % | The slurry remains fluid and homogeneous for: | *** | The slurry hardens or becomes compact and unsuitable for re-mixing after: |
| 12 | AB-AC/CP10/XG-K35R | 1.8-0.3/0.5/0.27-0.25 | | 5° C. | >6 weeks | >6 weeks |
|    |                    |                       | | 20° C. | >14 weeks | >14 weeks |
|    |                    |                       | | 40° C. | >6 weeks | >6 weeks |
| 13 | AB-AC/CP10/XG-K35R | 1.8-0.3/0.5/0.27-0.25 | | | | |

***: The slurry jellifies or settles without setting, it may recover its production aspect after more or less significant stirring.
E.S: Dry extract of the slurry; here 62%
Products used:
AB: boric acid
AC: citric acid
XG: KELZAN XG: Xanthan gum marketed by KELCO
Bent-G: Bentonite clay
CP10: SOKALAN CP 10: dispersive agent marketed by BASF
K35R: Ecocide K35R
Eth: Ethanol 95%

The setting accelerators 1 to 7 are prepared without colouring agent.

The setting accelerators 8 to 13 are prepared with a colouring agent: the setting accelerators 8 to 11 contain 12% pigment in weight relative to the calcium aluminate, and the setting accelerators 12 and 13 contain 1.5% in weight of pigment relative to the calcium aluminate.

- N°8: colouring agent made by Chryso, whereof the tradename is "vert Irlande" and of chemical nature: chromium oxide
- N°9: colouring agent made by Chryso, whereof the tradename is "slurry vert Irlande" and of chemical nature: chromium oxide
- N°10: colouring agent made by Chryso, whereof the tradename is "rouge Pompei" and of chemical nature: iron oxide
- N°11: colouring agent made by Chryso, whereof the tradename is "slurry rouge Pompei" and of chemical nature: iron oxide
- N°12: Copper phtalocyanine
- N°13: Naphtol AS.

EXAMPLE 2

Penetration strength tests are conducted on 3 fill mortars based on Portland cement, accelerated using the setting accelerators n°3, 11 and 12 of the Example 1 and 63 day old.

The mortars tested are re-diggable mortars of the type of those used for filling small trenches.

These mortars show a water/cement ration of approx. 2, and an water content of approx. 15%.

The composition of the mortars is given in Table 2.

TABLE 2

| Sand 1-4 mm | 990 kg/m³ |
|---|---|
| Sand 0.315-1 mm | 380 kg/m³ |
| Sand 0-0.315 mm | 170 kg/m³ |
| Portland cement (Le Havre CEMI 52.5 CP2) | 100 kg/m³ |
| Calcium aluminates | 25 kg/m³ |
| Water | 200 kg/m³ |
| Air entraining agent | 1 kg/m³ |

In all the examples, the sands us ed are "Palvadeau"-type siliceous sands.

The penetration strength is measured with test pieces of size 7×23.5×17 cm (used for the "foot test", which consists in walking on the mortar to determiner the approximate time at the end of which it can be walked on without leaving footprints greater than 2 mm) and 13×34×14 (used for the penetrometer measurements according to the standard ASTM C403).

The penetrometer enables to measure the penetration strength of a circular mobile under controlled load. Tracking the level of load to be applied to penetrate the mobile at a given depth thus enables to follow the structuration of the material.

When digging small trenches by means of continuous diggers, as marketed in France by MARAIS and described in the patent FR 2 751 676, the site tests have shown that the lift of the material placed in the trench was reached when the penetration strength measured using the penetrometer reaches 170 KPa.

Figure 1:
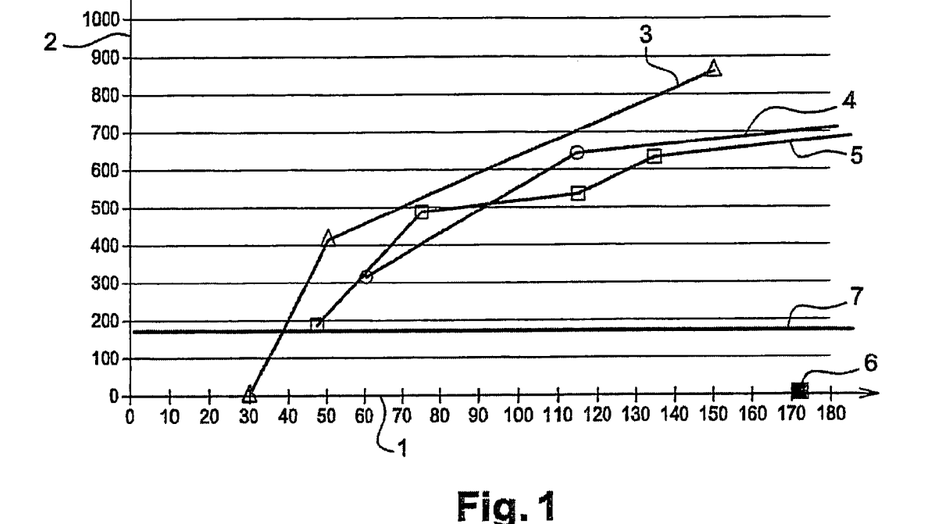
FIG. 1 represents the penetration strength in relation to time, of different mortars whereof the setting is accelerated by of the setting accelerators according to the invention.

FIG. 1 shows the evolution of the penetration strength of the 3 mortars prepared over time. The axis of the abscissae 1 represents the time in minutes. The axis of the ordinates 2 represents the penetration strength (in kPa).

Curve 3 represents the strength of the mortar accelerated by the setting accelerator n°11.

Curve 4 represents the strength of the mortar accelerated by the setting accelerator n°3.

Curve 5 represents the strength of the mortar accelerated by the setting accelerator n°12.

The point 6 on the FIG. 1 represents the mortar without a setting accelerator.

One has also plotted on FIG. 1 the 170 kPa limit to be reached in order to obtain a 65 kg-lift (curve 7).

EXAMPLE 3

Penetration strength is measured on different fill mortars, in order to study the influence of the setting accelerator content, as well as the influence of the phase C3A content in Portland cement.

The composition of the mortars tested is shown in Table 3.

TABLE 3

| | |
|---|---|
| Sand 1-4 mm | 990 kg/m³ |
| Sand 0.315-1 mm | 380 kg/m³ |
| Sand 0-0.315 mm | 170 kg/m³ |
| Portland cement | 100 kg/m³ |
| Water | 200 kg/m³ |
| Air entraining agent | 1 kg/m³ |

Two Portland Cements are Used:
CPA CEMI 52.5 CP2 of the Frangey factory (12% C3A)
ICPA CEMI 52.5 CP2 of the Teil factory (4% C3A)
The mortars are accelerated by the setting accelerator n°9 of Example 1.

Figure 2:
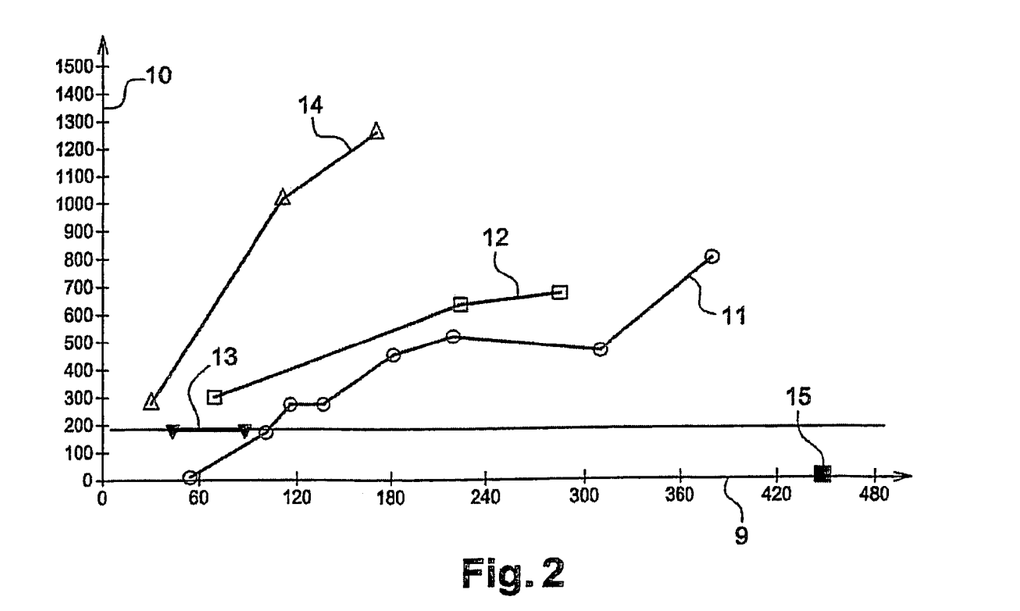
FIG. 2 represents the penetration strength in relation to time, of different mortars whereof the setting is accelerated by a setting accelerator according to the invention, for different contents of setting accelerator.

FIG. 2 represents the penetration strength in relation to time of 4 mortars comprising Portland cement of the Frangey factory.

The axis of the abscissae 9 represents the time in minutes. The axis of the ordinates 10 represents the penetration strength (in kPa).

Each mortar has been accelerated with a different calcium aluminate content: 10%, 20%, 30%, 40%, in weight relative to the total weight of Portland cement:
curve 11: 10% calcium aluminate; air content in the mortar: 15.2%;
curve 12: 20% calcium aluminate; air content in the mortar: 17,3%;
curve 13: 40% calcium aluminate; air content in the mortar: 14.9%;
curve 14: 30% calcium aluminate; air content in the mortar: 16%;
point 15: Portland cement on its own, air content: 15.4%.

Figure 3:
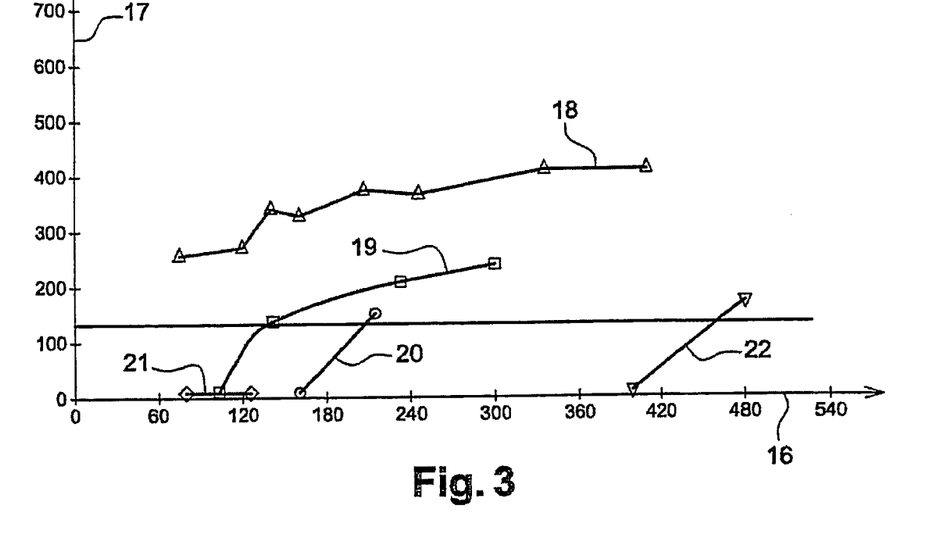
FIG. 3 represents the penetration strength in relation to time, of different mortars whereof the setting is accelerated by a setting accelerator according to the invention, for different contents of setting accelerator.

FIG. 3 represents the penetration strength in relation to time of 4 mortars comprising Portland cement of the Teil factory.

The axis of the abscissae 16 represents time in minutes. The axis of the ordinates 17 represents the penetration strength (in kPa).

Each mortar has been accelerated with a different calcium aluminate content: 10%, 20%, 30%, 40%, in weight relative to the total weight of Portland cement:
curve 18: 10% calcium aluminate; air content in the mortar: 16%;
curve 19: 20% calcium aluminate; air content in the mortar: 16.7%;
curve 20: 30% calcium aluminate; air content in the mortar: 14%;
curve 21: 40% calcium aluminate; air content in the mortar: 14%;
curve 22: Portland cement on its own, air content: 14.8%.

FIGS. 2 and 3 show that it is possible to recommend a setting accelerator content in function, on the one hand of the Portland cement used, on the other hand of the time delay sought after as regards the lift of the material.

EXAMPLE 4

The compression strength of a fill mortar is measured, relative to the setting accelerator content.

The composition of the mortar tested is that given in Table 3 of the Example 3 with the CPA CEMI 52.5 CP2 of the Havre factory (8% C3A)

The setting of the mortar is accelerated by the setting accelerator n°2 of the Example 1.

The compression strength is measured on test pieces 4×4×16 cm.

Figure 4:
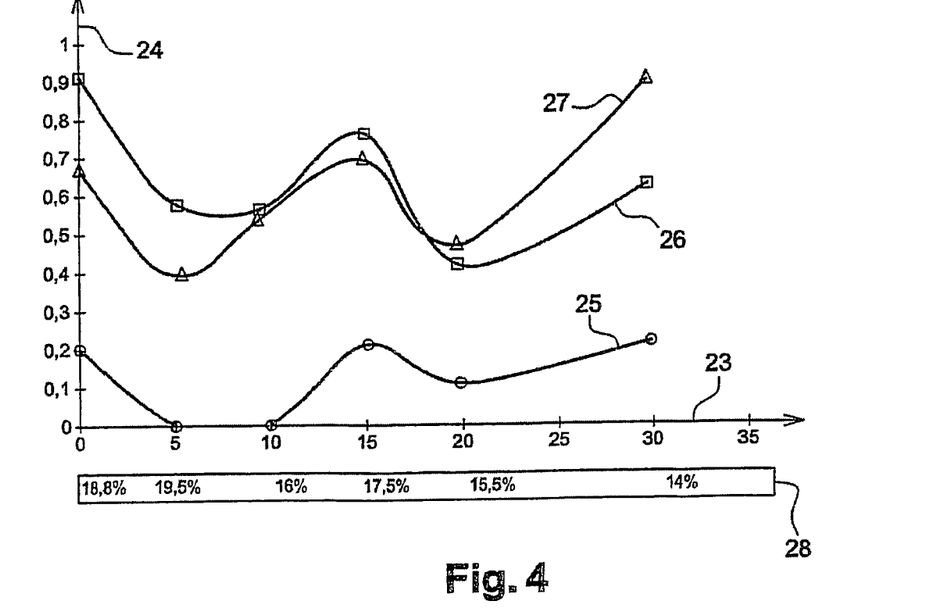
FIG. 4 represents the compression strength after 1 day, 7 days and 28 days, of a mortar whereof the setting is accelerated by a setting accelerator according to the invention, relative to the setting accelerator content.

On FIG. 4, the axis of the abscissae 23 represents the calcium aluminate content in the mortar, in % in weight relative to the weight of Portland cement. The axis of the ordinates 24 represents the compression strength of the mortar (in MPa).

FIG. 4 shows the mechanical compression strength after 1 day (curve 25), 7 days (curve 26) and 28 days (curve 27), of the mortar relative to the calcium aluminate content relative to the weight of Portland cement.

The axis 28 represents the percentage of entrained air.

FIG. 4 shows that the mechanical compression strengths after 28 days are small, which enables to guarantee the possibility of re-digging the material over a longer period.

EXAMPLE 5

The present example intends to put in evidence the significance of the boric acid and citric acid retardants.

Figure 5:
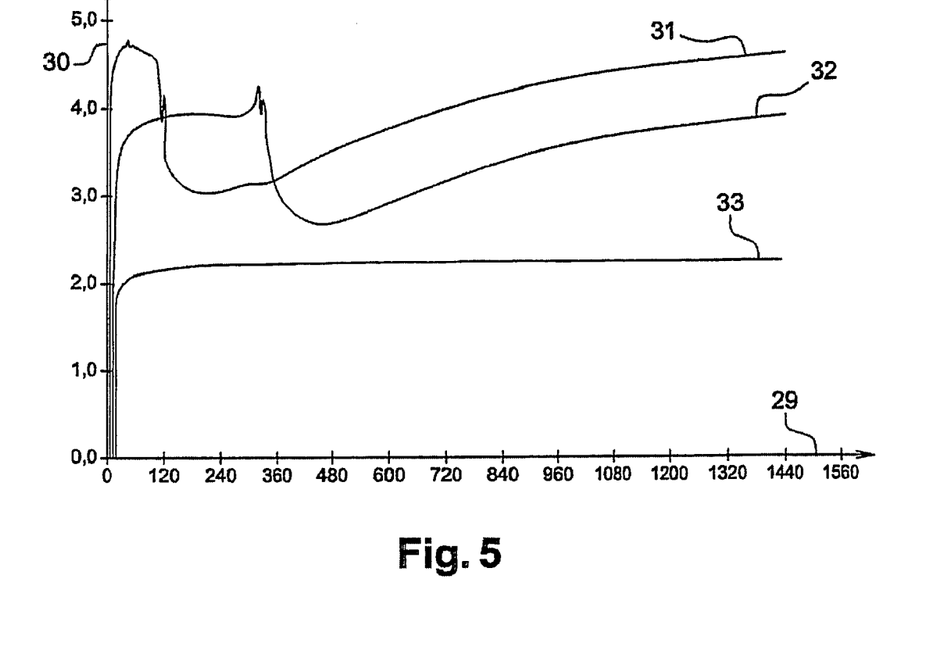
FIG. 5 represents the effect of boric acid on the hydration of the calcium aluminates.
Figure 6:
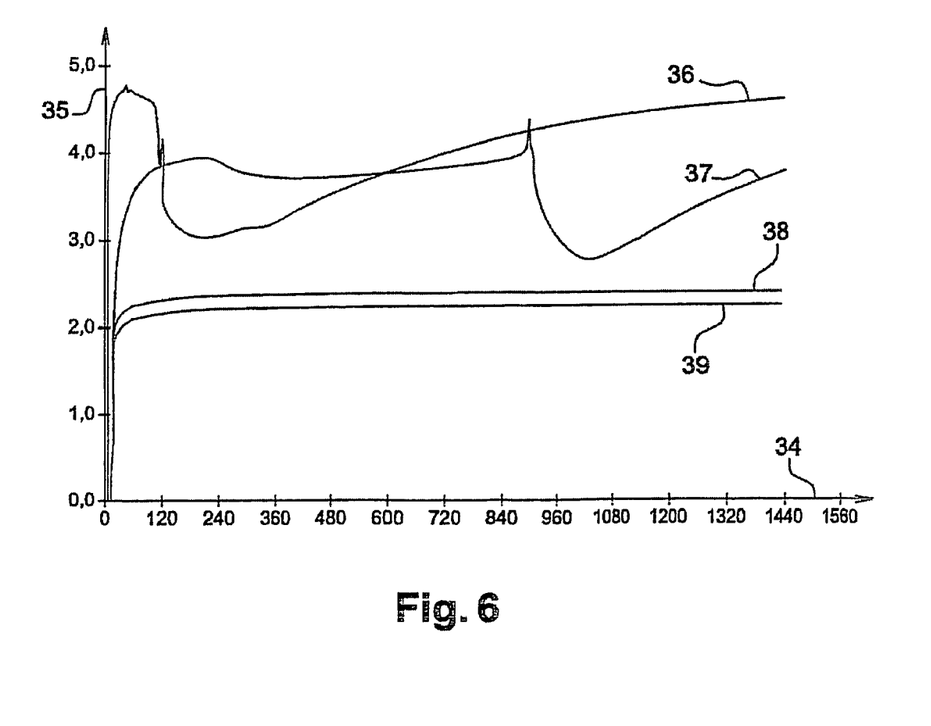
FIG. 6 represents the effect of boric acid and of citric acid on the hydration of the calcium aluminates.

The electric conductivity of different aluminate cements is measured in the presence of boric acid at different dosages (FIG. 5) or boric acid and citric acid at different dosages (FIG. 6). The aluminous cements show a water/cement ratio equal to 5. The electric conductivity is measured at 40° C.

On FIG. 5, the axis of the abscissae 29 represents time in minutes. The axis of the ordinates 30 represents the electric conductivity (in mS).

Curve 31 represents the conductivity of the aluminous cement on its own.

Curve 32 represents the conductivity of the aluminous cement in presence of 0.6% in weight of boric acid.

Curve 33 represents the conductivity of the aluminous cement in presence of 1.8% in weight of boric acid.

On FIG. 6, the axis of the abscissae 34 represents time in minutes. The axis of the ordinates 35 represents the electric conductivity (in mS).

Curve 36 represents the conductivity of the aluminous cement on its own.

Curve 37 represents the conductivity of the aluminous cement in presence of 0.6% in weight of boric acid and 0.1% in weight of citric acid.

Curve 38 represents the conductivity of the aluminous cement in presence of 1.2% in weight of boric acid and 0.2% in weight of citric acid.

Curve 39 represents the conductivity of the aluminous cement in presence of 1.8% in weight of boric acid and 0.3% in weight of citric acid.

The results show that:
the presence of boric acid in the medium limits more and more the dissolution of the cement when the concentration increases: the level of conductivity reached decreases accordingly in value (FIG. 5);
the addition of citric acid delays mass precipitation of the hydrates corresponding to the setting: the drop in conductivity is postponed to later dates when adding said constituent, then when its content increases.

EXAMPLE 6

The present example intends to put in evidence the relative signification of the boric acid and citric acid setting retardants.

Certain colouring agents added in the setting accelerators may disturb the interaction between the setting inhibitor and the calcium aluminate(s).

For instance, in the presence of high specific surface mineral colouring agents, such as the colouring agent marketed under the reference <<OCRA>> by CHRYSO, the lifetime of the setting accelerator may be reduced considerably.

The present example then intends to compare the lifetime and the accelerating power of setting accelerators coloured with the ochre mineral colouring agent <<OCRA>>.

Three setting accelerators are tested. Each includes 87% in weight of calcium aluminate and 13% in weight of colouring agent <<OCRA>>. They have a dry extract of 82%.

Table 4 shows the composition of the setting accelerators in inhibitor and in admixtures.

The notations used are the same as those defined in Example 1.

The compositions are given in weight relative to the total weight of the calcium aluminate(s).

The setting accelerators n°14 and n°16 are setting accelerators according to the invention. The setting accelerator n°15 is not a setting accelerator according to the invention.

TABLE 4

|  | N°14 | N°15 | N°16 |
|---|---|---|---|
| % AB | 1.81% | 4.82% | 3.61% |
| % AC | 0.31% | 0.83% | 0.00% |
| % CP10 | 0.52% | 1.38% | 0.85% |
| % XG | 0.27% | 0.72% | 0.27% |
| % K35R | 0.25% | 0.67% | 0.26% |
| Lifetime of the setting accelerator | 2 weeks | >29 weeks | 22 weeks |

To measure the accelerating power of the setting accelerators, 3 mortars are formulated on the base of Portland cement accelerated respectively by the setting accelerators n°14, 15 and 16, one week old.

The composition of the mortars is given in Table 5.

TABLE 5

| Sand AFNOR in 196-1 | 1 520 Kg/m³ |
|---|---|
| Portland cements (Le Havre CEMI 52.5 CP2) | 560 Kg/m³ |
| Water | 225 Kg/m³ |
| Setting accelerator | 227 Kg/m³ |

These mortars contain 20% in weight of calcium aluminate in dry extract relative to the weight of Portland cement.

Results

Figure 7:
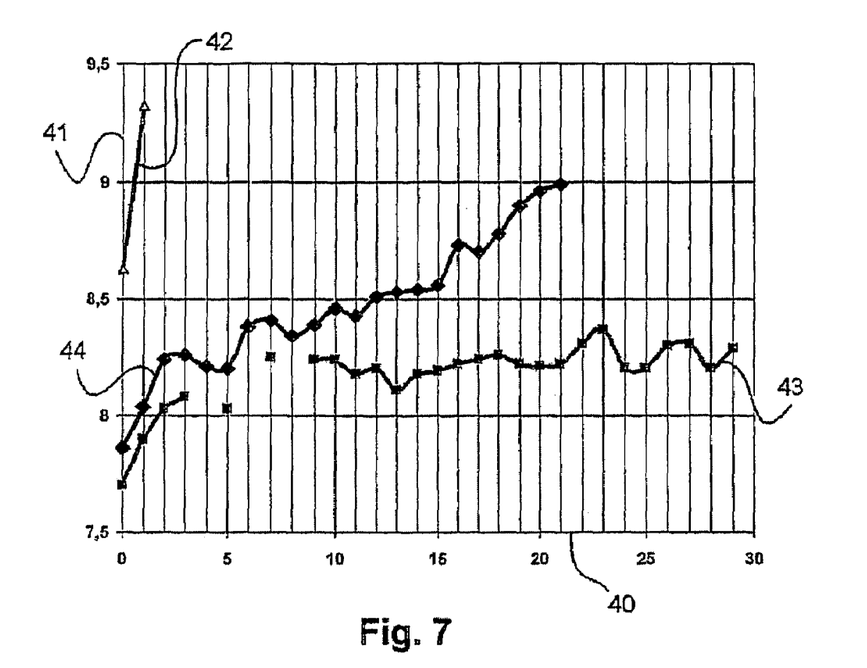
FIG. 7 represents the evolution of the pH of different setting accelerators, in relation to time.

FIG. 7 represents the evolution of the pH of the setting accelerators kept at 45° C., in relation to time.

The axis of the abscissae 40 represents time, in weeks.

The axis of the ordinates 41 represents the pH of the setting accelerators.

The lifetime of the setting accelerators is deduced from direct observations each week: The end of life is noted when the setting accelerator is hard.

The pH of the setting accelerators is also measured each week.

It can be noted that the setting accelerators set when the pH exceeds the value of 9 to 9.5.

Curve 42 represents the pH of the setting accelerator n°14.
Curve 43 represents the pH of the setting accelerator n°15.
Curve 44 represents the pH of the setting accelerator n°16.

Figure 8:
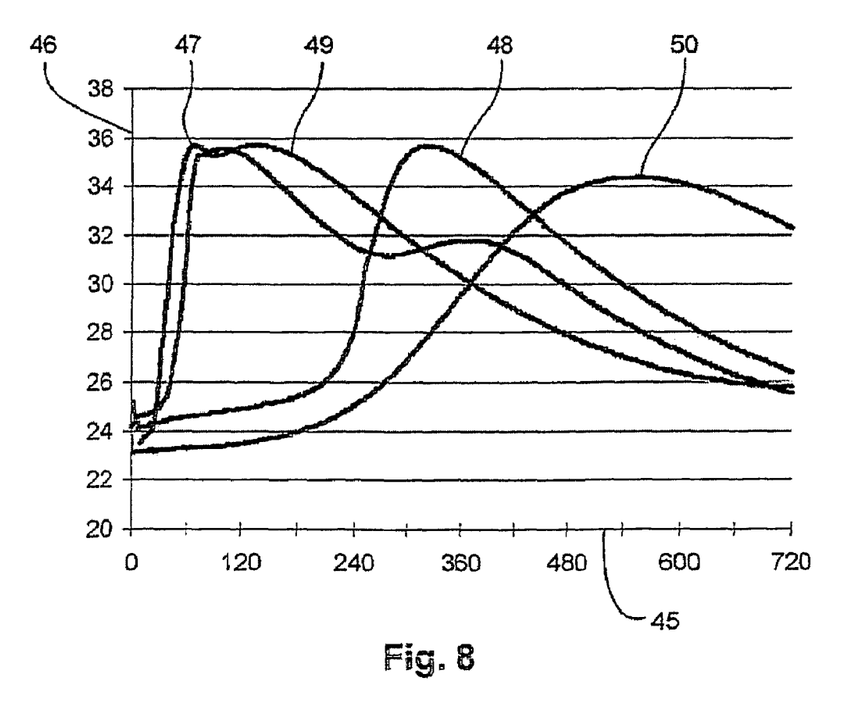
FIG. 8 represents the heating curves of a mortar whereof the setting is accelerated by different setting accelerators.

The accelerating power of the setting accelerators may be deduced from FIG. 8, which represents the heating curves of the accelerated mortars. The heating curves enable to compare the hydration kinetics.

The heating of the mortars is measured while inserting a thermocouple in each mortar, properly speaking contained in a cylindrical cup of approx. 8 cm in diameter and 8 cm in height kept in semi-adiabatic mode in a polystyrene box.

The axis of the abscissae 45 represents time in minutes.
The axis of the ordinates 46 represents the temperature of the mortars in ° C.

Curve 47 represents the temperature of the mortar accelerated by the setting accelerator n°14.

Curve 48 represents the temperature of the mortar accelerated by the setting accelerator n°15.

Curve 49 represents the temperature of the mortar accelerated by the setting accelerator n°16.

Curve 50 represents the temperature of a mortar of same composition as the previous mortars, but which has not been accelerated by a setting accelerator.

It can be observed that the lifetime of the setting accelerator n°14 is equal to 2 weeks.

It can be noted that the setting accelerator n°14 corresponds to the setting accelerator n°3 of Example 1, to which the colouring agent <<OCRA>> has been added. Still, the lifetime of the setting accelerator n°3 is greater than 9 weeks.

The lifetime of the setting accelerator n°16 is 22 weeks.

Simultaneous increase in the boric and citric acids, as well as that of the CP10 (dispersive agent), enables to lengthen considerably the lifetime: the setting accelerator n°15 is always stable after 29 weeks.

Conversely, said setting accelerator n°15 has lost its accelerating power. As shown on FIG. 8, the heating peak of the mortar accelerated by the setting accelerator n°15 starts around 200 minutes, i.e. around after the same time as the non-accelerated mortar, whereas that of the mortar accelerated by the setting accelerator n°14 starts around 30 minutes.

Increasing the boric acid only and suppressing the citric acid (which corresponds to the setting accelerator n°16) enables simultaneously to lengthen the lifetime of the setting accelerator and to keep its accelerating capacity. Thus, the setting accelerator n°16 has a lifetime of 22 weeks, against 2 weeks for the setting accelerator n°14, but the heating kinetics of the mortar accelerated by this accelerator is almost identical to that of the mortar accelerated by the setting accelerator n°14.

The invention claimed is:

1. A setting accelerator for a composition comprising Portland cement, comprising:
    at least one calcium aluminate;
    a setting inhibitor of aluminous cements comprising boric acid and/or at least one boric acid salt, the setting inhibitor representing from 0.5 to 4% by weight relative to the total weight of the calcium aluminate; and
    at least one anti-settling agent, wherein
    said setting accelerator is an aqueous suspension.

2. The setting accelerator according to claim 1, further comprising at least one dispersive agent.

3. The setting accelerator according to claim 1, wherein,
    the setting inhibitor further comprises citric acid and/or at least one citric acid salt,
    the boric acid and/or the boric acid salt represents from 0.4 to 3% by weight of the total weight of the calcium aluminate, and citric acid and/or the citric acid salt represents from 0.1 to 1% by weight of the total weight of the calcium aluminate.

4. The setting accelerator according to claim 1, wherein the setting inhibitor consists of boric acid and/or at least one boric acid salt,
the boric acid and/or the boric acid salt(s) represents from 0.5 to 4% in weight of the total weight of the calcium aluminate.

5. The setting accelerator according to claim 3, wherein the boric acid salt is selected from the group consisting of zinc borate, sodium borate and mixtures thereof.

6. The setting accelerator according to claim 3, wherein the setting inhibitor comprises boric acid and citric acid.

7. The setting accelerator according to claim 2, wherein the dispersive agent represents from 0.3 to 1.7% by weight of the total weight of the calcium aluminate.

8. The setting accelerator according to claim 1, wherein the anti-settling agent represents from 0.2 to 0.9% by weight of the total weight of the calcium aluminate.

9. The setting accelerator according to claim 1, wherein the anti-settling agent is selected from the group consisting of Xanthan gum, Welan gum, Bentonite and mixtures thereof.

10. The setting accelerator according to claim 1, further comprising an anti-bacterial agent representing from 0.2 to 0.9% in weight of the total weight of the calcium aluminate.

11. The setting accelerator according to claim 1, further comprising at least one coloring agent.

12. The setting accelerator according to claim 1, wherein the composition comprising Portland cement is selected from the group consisting of Portland cement, slag cements, pozzolana cements and hydraulic limes, as well as among mortars and concretes comprising Portland cement, slag cement, pozzolana cement and hydraulic lime.

13. The setting accelerator according to claim 2 wherein,
the setting inhibitor further comprises citric acid and/or at least one citric acid salt,
the boric acid salt and/or the boric acid salt represents from 0.4 to 3% by weight of the total weight of the calcium aluminate, and
the citric acid and/or the citric acid salt represents from 0.1 to 1% by weight of the total weight of the calcium aluminate.

14. The setting accelerator according to claim 2 wherein,
the setting inhibitor consists of boric acid and/or at least one boric acid salt, and
the boric acid and/or the boric acid salt represents from 0.5 to 4% by weight of the total weight of the calcium aluminate.

15. The setting accelerator according to claim 3, wherein the boric acid salt is selected from the group consisting of zinc borate, sodium borate and mixtures thereof.

* * * * *